Nov. 22, 1966  H. W. MULCAHY ET AL  3,286,526
PRESSURE TRANSDUCER
Filed April 27, 1964
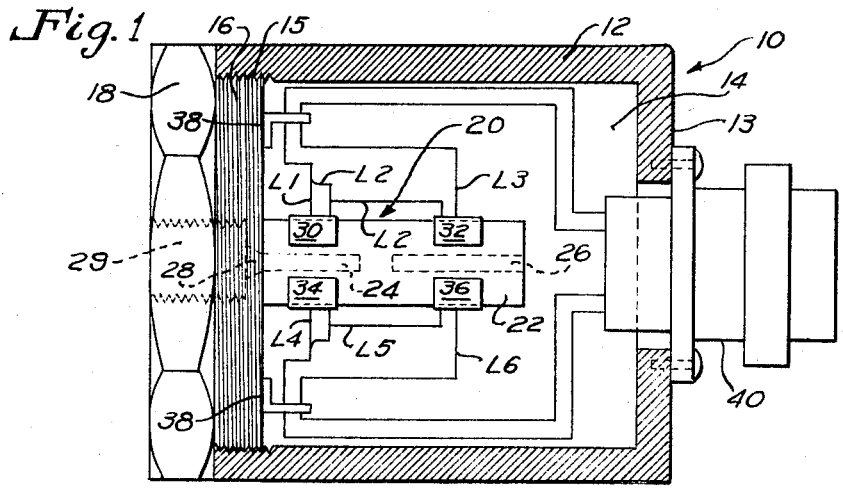
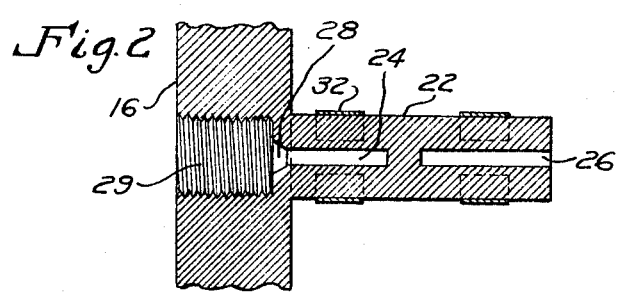
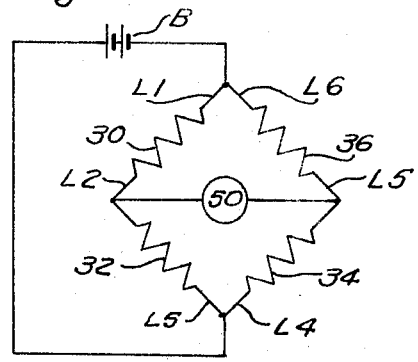
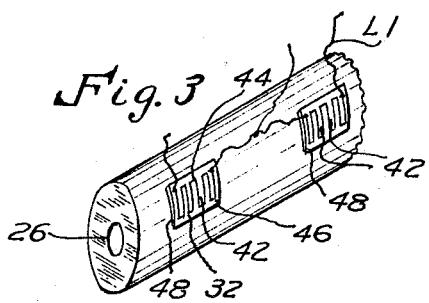
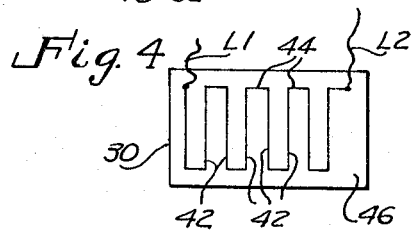
INVENTORS
Harry W. Mulcahy
Richard G. Tillou
BY
Edward L. Jarow
Atty.

United States Patent Office 3,286,526
Patented Nov. 22, 1966

3,286,526
PRESSURE TRANSDUCER
Harry W. Mulcahy, Chicago, and Richard G. Tillou, Clarendon Hills, Ill., assignors to W. H. Miner, Inc., Chicago, Ill., a corporation of Delaware
Filed Apr. 27, 1964, Ser. No. 362,649
10 Claims. (Cl. 73—393)

This invention relates in general to transducers and, more particularly, to an improved transducer for transforming high fluid pressure variations into electrical signals.

One well accepted method of providing sensitive and accurate indications of fluid pressures and changes therein involves transforming same into readable electrical signals. In order to transform fluid pressures into electrical signals capable of calibration, a transducer which responds mechanically and/or physically to fluid pressure changes and which has electrical strain gauges associated therewith is employed. The transducer may be characterized by a diaphragm or other movable member that is responsive to fluid pressure changes whereby strain gauges associated therewith will vary their electrical parameters and thereby create readable indications of the fluid pressures. This type of arrangement presents some difficulties in transducers of the type presently in use especially where high fluid pressures are involved due to the delicate nature of their construction. It has been found that unusual stresses may result in complete disablement of such apparatus.

The strain gauges which comprise resistance components which vary in accordance with the strain exerted thereon are usually connected in a Wheatstone bridge circuit with the various components of the bridge being exposed to different environments and therefore different temperatures. Unless some precautionary measures are taken to avoid the effects of temperature variations, the electrical signals will therefore not reflect the true fluid pressure changes. While a wide variety of techniques may be adopted to avoid the effects of temperature variations, these are largely characterized by complex arrangements and procedures.

In addition, the frequency response of a transducer is subject to a number of variables and may tend to fall off in the high frequency range of pressure variations unless precautionary measures are taken to insure that each pressure change developed in the transducer is developed with minimum loss or phase shift.

It is therefore an important object of the present invention to provide a new and improved transducer of sturdy construction for use in translating or transforming high fluid pressure changes into corresponding electrical signals.

It is another important object of the present invention to provide a new and improved transducer which is adapted to automatically compensate for any temperature variations which would otherwise produce faulty readings.

It is another object of the present invention to provide a fluid pressure transducer having improved accuracy of frequency response.

It is a further object of the present invention to provide a more sensitive transducer for sensing variations in fluid pressures.

Briefly, the objects of the present invention are accomplished in a unique and simple manner. The transducer comprises a unitary cylindrical element having similar or identical bores or recesses at opposite ends. One bore serves to receive the fluid and is of smaller diameter than the entry port and associated conduits which conduct the fluid to the bore. The changes in fluid pressure are therefore immediately transmitted to the one bore to provide excellent frequency response since pressure variations are effective at the element with a minimum of delay.

Strain gauges are provided in each leg of the Wheatstone bridge and the gauges in the respective legs of the bridge are bonded to the transducer adjacent a respective one of the bores and in a direction for responding to circumferential or hoop strains. This provides a rugged unitary construction in which the body of each fragile gauge is substantially supported over its entire area and is subjected to substantially the same temperature effect. Thus, the transducer mass is substantially identical adjacent the two pairs of bridge legs and therefore its temperature varies at the same rate adjacent the gauges in each bridge leg. The bridge legs therefore respond in the same manner to strains arising from temperature changes so that temperature compensation is automatically maintained. With the bridge legs following temperature changes in the same manner, the circumferential or hoop strains superimposed by fluid pressure on the temperature changes are accurately detected without the need for complex compensating apparatus.

The manner in which the foregoing and other objects of the present invention are accomplished will become apparent on examination of the following specification and claims, together with the drawings, wherein:

FIG. 1 is a sectional view of the transducer assembly casing and illustrates the general arrangement of the components of the transducer assembly;

FIG. 2 is a sectional view of the transducer;

FIG. 3 is a perspective view illustrating the orientation of the strain gauges with respect to the transducer;

FIG. 4 illustrates one of the strain gauges in plan view; and

FIG. 5 illustrates a typical Wheatstone bridge circuit in which the strain gauges may be arranged.

In FIG. 1, a transducer assembly is generally indicated by the reference number 10. The assembly 10 comprises an outer casing 12 having a rear wall 13 at one end and defining a chamber 14. The other end of the casing 12 is provided with internal threads 15 in which is threaded a fitting 16.

The fitting 16 has a flange 18 with a hexagonal periphery thereon which permits the fitting to be firmly threaded into the casing 12 by a wrench with the flange 18 engaged against the threaded end of casing 12. A transducer 20 is carried on one side of the fitting 16 and is received in the chamber 14 when the fitting 16 is threaded into the casing 12.

The transducer 20 comprises a single solid body element 22 of elastic material such as metal typified by steel, or a plastic typified by nylon or rubber. The element 22 may be formed integrally with the fitting 16. An axial cylindrical bore 24 and 26, respectively, is provided in respective opposite ends of the body element 22. The periphery of the body element 22 is provided with a corresponding cylindrical configuration of identical diameter at least in the portion thereof adjacent the bores 24 and 26. The bores or recesses 24 and 26 are of identical dimension and for example may be of ³⁄₃₂" diameter while the diameter of element 22 may be ⁵⁄₁₆".

The bore 24 communicates through an outwardly flared port 28 and through an enlarged threaded passageway 29 to a conduit (not shown). The conduit is usually provided with a nipple which is received in the threaded passageway 29 and serves to transmit fluid under pressure to the bore 24 thus causing the body element 22 in the vicinity of bore 24 to expand or contract circumferentially in response to the variations in fluid pressure.

The other recess 26 is simply exposed to the atmosphere. Due to the identical size of the bores 24 and 26 and the identical diameter of the element 22 adjacent the bores, the mass of transducer material adjacent the two bores is identical and therefore the extent of the expansion or contraction thereof in response to temperature variations will be similar.

A plurality of strain gauges 30, 32, 34 and 36 are mounted on the periphery of the element 22 with gauges 30 and 34 being mounted along opposite radial lines adjacent the bore 24 and the gauges 32 and 36 being mounted along opposite radial lines adjacent the bore 26. The gauges are arranged in a Wheatstone bridge circuit and electrical connections to and between the strain gauges are established via the leads L1, L2, L3, L4, L5 and L6. The leads L1–L6 may be cabled and suitably supported by brackets 38, for example, carried on the fitting 16 for extension to an electrical connector 40 fastened on the rear wall 13 of the casing 12. The connector 40 is provided for ease in establishing external connections to the strain gauges.

The strain gauges may take a wide variety of forms. However, the principle of their arrangement on the transducer is illustrated with resistance strain gauges of conventional form. As shown in FIG. 4 the strain gauges, typified by gauge 30, each comprises a plurality of electrical resistance legs 42 arranged in parallel and connected in series by short legs 44 and carried, for example, on a plastic sheet 46.

As seen in FIG. 3 the strain gauges 30, 32, 34 and 36 are bonded by an epoxy cement 48 or otherwise to the transducer 20 with the legs 42 lying generally along respective circumferential arcs of the transducer and transverse to the longitudinal axis of the transducer. Therefore, when the element 22 is subjected to expansive forces, or hoop strains, the legs 42 are stressed along their longitudinal axis in accordance with the forces and the electrical resistance of the gauge is varied accordingly.

A seen in FIG. 5, the strain gauges 30, 32, 34 and 36 are arranged in a Wheatstone bridge with power to the bridge being supplied by a source B through the electrical connector 40 and the leads L1, L3, L4 and L6. The bridge includes one leg in which gauges 30 and 32 are arranged in series and a second leg in which gauges 34 and 36 are arranged in series, see FIG. 5, with the fluid pressure sensing gauges 30 and 34 being in opposite corners of the bridge and the dummy gauges 32 and 36 being in other opposite corners of the bridge. One terminal of both gauges 30 and 36 are connected to one side of the source B via leads L1 and L6 while one terminal of both gauges 32 and 34 are connected in the other side of the source B via leads L3 and L4. The juncture of gauges 30 and 32 are connected by lead L2 and via the connector 40 to one side of a conventional meter or indicating apparatus 50. The juncture of gauges 34 and 36 are connected to the other side of the indicating apparatus 50 by the lead L5 and via the connector 40.

Thus, if the resistance in gauge 30 is altered in response to fluid pressure, the potential at the lead L2 will change in one direction and since gauge 34 will be similarly altered the potential at lead L5 will change in the opposite direction to provide a potential difference across the meter 50. The meter 50 responds thereto to indicate the magnitude of the potential and therefore the magnitude of the pressure applied to alter the resistance of gauges 30 and 34. The gauges 32 and 36 are therefore dummy gauges in that they sense the ambient conditions to which the gauges 30 and 32 are subject and serve to balance the bridge for those ambient conditions.

In operation, a conduit is threadedly connected to the passageway 29 for transmitting fluid under pressure to the bore 24. Initially, and before the fluid is transmitted, all of the strain gauges are similarly affected by any expansion or contraction of the element 22 due to temperatures and pressures being uniform throughout element 22 and therefore the potential across the meter 50 will normally be zero. Adjustable resistance elements may be utilized in the bridge for calibration of the meter 50 in the event the strain gauges differ in their characteristics or to compensate for variations in the orientation or parameters of the assembly. However, with the orientation previously described such adjustment is substantially minimized.

Transmission of the fluid through the comparatively large passageway 29 and port 28 into the bore 24 occurs with minimum interference with the pressure head. The pressure is exerted to circumferentially expand the element 22 adjacent the gauges 30 and 34, wherefore the resistance legs 42 of these gauges are stressed accordingly. The potential across the gauges 30 and 34 rises by an amount corresponding to the pressure to create a potential difference across meter 50 corresponding to the algebraic sum of the potentials across gauges 30 and 34. The apparatus 50 is therefore operated to indicate the fluid pressure.

When the fluid is at ambient temperature, all of the strain gauges remain affected in a similar manner, so that the bridge remains balanced. If the fluid is substantially above or below ambient temperatures, the volume of the fluid in the bore 24 as compared to the volume of the element 22 is sufficient to ensure that the portions of the element adjacent the strain gauges are similarly affected by the fluid temperature so that temperature compensation occurs automatically to thereby prevent distortion of the electrical output.

It will be noted that the fluid pressure, which may rise as high as 30,000 pounds per square inch, is not applied against any directly movable component but instead is applied against a solid element which is adapted to absorb severe shocks and to which the gauges are bonded so that sudden variations in pressure do not upset destructively or otherwise the relative positions of the components. On the other hand, due to the low losses in the bore 24 as compared to the fluid passageways and the low hysteresis of the element 22, high frequency pressure variations are easily and accurately detected or sensed.

Since certain changes can be made in the foregoing construction and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. A transducer assembly for use in translating fluid pressures which are adapted to vary at any one of a number of different rates into electrical signals corresponding in value to the fluid pressure with variations in temperature being automatically compensated, said assembly comprising a solid cylindrical element having one cylindrical axial bore formed in one end and adapted to be connected to a source of fluid pressure with the diameter of said bore being less than the diameter of any fluid passageway interconnected between said bore and said source and having a second axial bore identical in diameter to said one bore formed in the opposite end of said cylindrical element and adapted to be exposed to the atmosphere, and a series of four strain gauges bonded to the outer surface of said element in a manner such that same respond to hoop strains in said element with two of said gauges being adjacent said one bore and with the other two gauges being adjacent said second bore, said gauges being connected in separate legs of a Wheatstone bridge.

2. The transducer assembly recited in claim 1 wherein said cylindrical element is formed of metal.

3. The transducer assembly recited in claim 1 wherein said cylindrical element is formed of rubber.

4. The transducer asssembly recited in claim 1 wherein said cylindrical element is formed of nylon.

5. The transducer assembly recited in claim 1 wherein the diameter of said bores approximates 3/32" and the diameter of said element approximates 5/16".

6. The transducer assembly recited in claim 1 wherein said one bore is adapted to be subjected to pressures of 30,000 p.s.i. without said gauges and element becoming disassociated.

7. A transducer assembly for use in translating fluid pressures into corresponding electrical signals, the improvement comprising an elongated element having a pair of longitudinally spaced axial bores of substantially identical dimensions formed in its opposite ends whereby the mass of said element adjacent each bore is identical, one of said bores adapted to communicate with a fluid under pressure and the other bore being adapted to be exposed to atmosphere, a plurality of first strain gauges bonded to said element adjacent said one bore and arranged to respond to hoop strains in said element caused by either fluid pressures or temperature variations, and a second plurality of strain gauges bonded to said element adjacent said other bore and arranged to respond to hoop strains in said element caused by temperature variations with said first and second plurality of strain gauges adapted to be arranged in a Wheatstone bridge having one gauge in each plurality in opposite legs of said bridge whereby electrical changes therein caused by fluid pressure are added algebraically and strains resulting from temperature variations are equally applied to all of said gauges.

8. A transducer assembly for use in translating fluid pressures into corresponding electrical signals, the improvement comprising a solid element having a pair of identical axial bores formed in the opposite ends thereof whereby the mass of said element adjacent each bore is identical, one of said bores adapted to communicate with a fluid under pressure and the other bore being adapted to be exposed to atmosphere, a plurality of resistance strain gauges bonded to said element adjacent said one bore with the resistance legs of said gauges arranged transverse to the longitudinal axis of said bore for responding to hoop strains in said element, and a second plurality of resistance strain gauges bonded to said element adjacent said other bore with the resistance legs of said second plurality of gauges arranged transverse to the longitudinal axis of said bore for responding to hoop strains in said element resulting from temperature variations.

9. A transducer assembly for use in translating a fluid pressure into an electrical signal, the improvement comprising a solid cylindrical element having a pair of identical axial bores formed in the opposite ends thereof whereby the mass of said element adjacent each bore is identical, one of said bores adapted to communicate with a fluid under pressure through a passageway having a cross section larger than said bore whereby the mass of said element adjacent said one bore is adapted to be subjected to fluid pressures with a minimum of delay in the transmission of said pressures, a plurality of first strain gauges bonded to said element adjacent said one bore and arranged to respond to circumferential strains in said element caused by either fluid pressures or temperature variations, and a second plurality of strain gauges bonded to said element adjacent the second bore and arranged to respond to circumferential strains in said element caused by temperature variations, said first and second plurality of strain gauges adapted to be arranged in a Wheatstone bridge with all of said gauges subjected to similar strains as a result of temperature conditions affecting said element and with each of said first gauges in opposite legs of said bridge whereby resistance changes therein caused by fluid pressure applied to said one bore are added algebraically for indicating fluid pressure in said one bore.

10. A transducer assembly for use in translating a fluid pressure into an electrical signal, the improvement comprising a solid elongated cylindrical element having a pair of identical axial bores formed in the opposite ends thereof whereby the mass of said element adjacent each bore is identical, one of said bores adapted to communicate with a fluid through a passageway having a larger cross section than said bore whereby the mass of said element adjacent said one bore is adapted to be subjected to fluid pressures with a minimum of delay in the transmission of said pressures, a plurality of first strain gauges bonded to said element adjacent said one bore and arranged to respond to circumferential strains in said element caused by either fluid pressures or temperature variations, a second plurality of strain gauges bonded to said element adjacent the second bore and arranged to respond to circumferential strains in said element caused by temperature variations, said first and second plurality of strain gauges adapted to be arranged in a Wheatstone bridge with said first gauges in opposite corners of said bridge whereby resistance changes therein caused by fluid pressure are added algebraically while the resistance of each gauge of said first and second plurality of strain gauges varies in the same manner in response to temperature variations affecting said element.

References Cited by the Examiner
UNITED STATES PATENTS

| | | | |
|---|---|---|---|
| 2,663,781 | 12/1953 | Rundell | 338—4 |
| 2,747,408 | 5/1956 | Boytim et al. | 73—398 |
| 2,885,520 | 5/1959 | Di Giovanni | 338—4 |

LOUIS R. PRINCE, *Primary Examiner.*

D. O. WOODIEL, *Assistant Examiner.*